June 22, 1954  B. FRANKLIN  2,681,978
ILLUMINATED FOOD ROASTER
Filed July 25, 1950
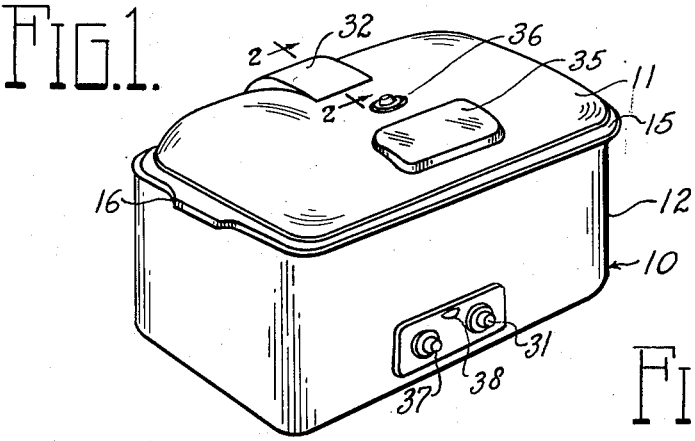
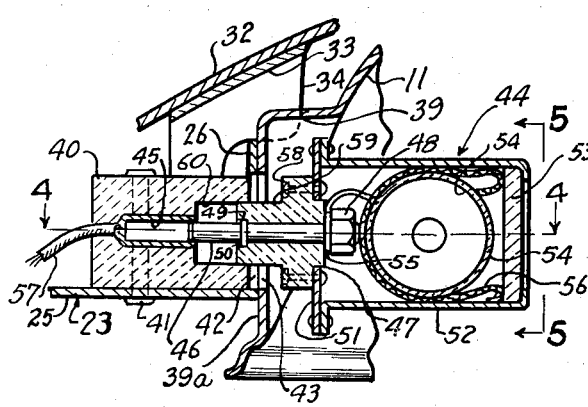
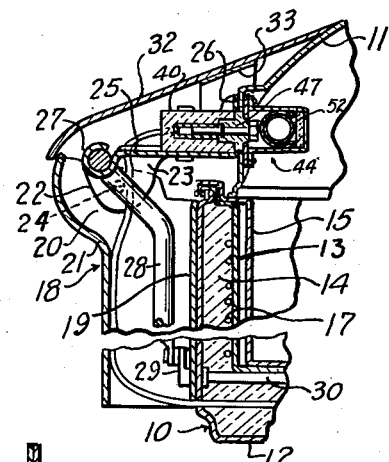
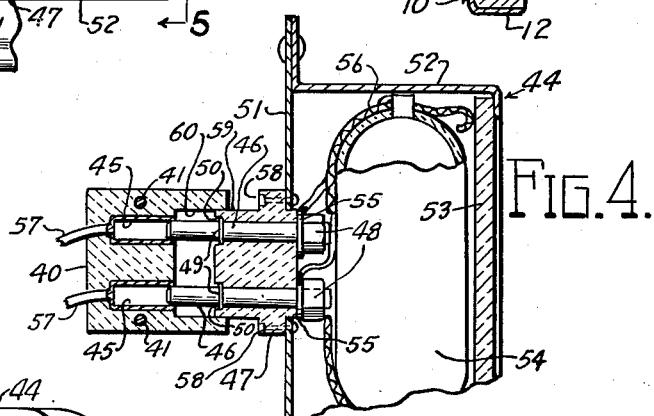
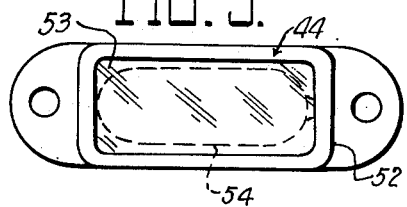
INVENTOR.
Burton Franklin
BY
Owen & Owen
ATTORNEYS Patented June 22, 1954

2,681,978

UNITED STATES PATENT OFFICE 2,681,978

ILLUMINATED FOOD ROASTER

Burton Franklin, Toledo, Ohio, assignor, by mesne assignments, to Tropic-Aire, Inc., Chicago, Ill., a corporation Application July 25, 1950, Serial No. 175,723

2 Claims. (Cl. 240—5)

This invention relates to a device for illuminating the interior of an open topped food roaster having a hinged cover and a window in the cover through which food cooking in the interior of the roaster can be observed during the cooking process.

A domestic electric food roaster usually consists of a body having an open top into which is removably inserted a pan in which the food to be cooked is placed. Heating means such as an electrical resistance coil is provided in the body and a cover for the pan frequently is hinged on the body and swings upwardly and rearwardly to permit access to the body for inserting and removing food to be cooked. In most of the domestic food roasters of the prior art it has been necessary to open or remove the cover in order to inspect the food being cooked. The necessity for removing the cover for a cursory inspection is undesirable because it allows the escape of considerable heat and, if the food being cooked contains water, large clouds of steam and vapor also escape from the roaster and may, indeed, scald the hands of the housewife.

Patent No. 2,209,693 issued July 30, 1940, to Kemper M. Hammell, discloses a separable hinge mechanism for a cover by means of which the cover can be opened and closed by rotating a knob located at the front exterior of the roaster body. The advantage in this construction lies in the fact that the housewife can open the cover without endangering her hands. It is not necessary for her either to lift the hot cover or to place her hands over the top of the roaster during the cover lifting operation. This construction represented a considerable improvement over roasters having loose removable covers or covers which merely were hinged to the bodies and could be lifted by hand.

There is a domestic type of food roaster in which the cover is permanently hinged to the body but which must be swung upwardly by hand and also has an illuminating light mounted in the hinge mechanism itself. The structure in this type of roaster provides for illuminating the interior of the food receptacle but the location of the lamp within the hinge enclosure subjects it to shocks and damage and makes it extremely difficult to replace when it burns out. Furthermore, in this type of roaster the permanency of the hinge connection between the roaster body and the cover prevents the removal of the cover to permit it to be washed to remove condensed cooking vapors which accumulate on its inner surfaces.

It is the principal object of this invention to provide an illuminating means for the interior of an open topped domestic food roaster in which the illuminating lamp is readily accessible from the interior of the roaster and can quickly and easily be replaced when it burns out.

It is a further object of this invention to provide an illuminating means for a domestic type food roaster having a hinged cover which is separable from the mechanism by which it is hingedly mounted and in which the illuminating lamp cooperates in retaining the cover in position on its hinging means.

It is a more specific object of this invention to provide an illuminating means for the interior of a domestic type food roaster equipped with remote cover lifting mechanism as disclosed in the Hammell patent above mentioned.

These objects are achieved by means of the construction and arrangement of parts which will be more fully understood by reference to the drawings, in which:

Figure 1 is a view in perspective of a food roaster of the general type in which an illuminating means embodying the invention is adapted to be employed.

Figure 2 is a fragmentary, vertical, sectional view on an enlarged scale of a rearmost portion of the cover of the roaster shown in Figure 1 taken substantially on the line 2—2 in Fig. 1, looking in the direction of the arrows, and illustrating both the hinge mechanism and an illuminating means embodying the invention.

Figure 3 is a fragmentary sectional detail view on an enlarged scale of an illuminating means embodying the invention and the parts associated therewith. It constitutes an enlargement of a portion of Fig. 2 but shows the removable lamp housing partially withdrawn from its socket.

Figure 4 is a fragmentary, horizontal, sectional view taken substantially on the line 4—4 of Figure 3.

Figure 5 is a view in elevation of a removable lamp housing taken from the position indicated by the line 5—5 of Figure 3, but on a smaller scale.

A domestic type food roaster in which an illuminating means embodying the invention is adapted to be employed may consist of an outer housing or body 10, shown as being of generally rectangular form and having an open top which is closed by a hinged cover 11. The body 10 (see also Figure 2) may consist in an outer shell 12, a pocket 13 and insulating material 14 which fills the space therebetween. A metal pan or insert 15 is removably inserted in the top of the pocket 13 and constitutes the cooking vessel. The insert 15 is provided with handles 16 (Figure 1) by which it can be removed and inserted in the roaster. An electrical resistance coil 17 surrounds the pocket 13 for heating the insert 15 and the food contained therein.

The cover 11 is hingedly mounted on the body 10 in position to overlie the insert 15 when closed by means of mechanism which will now be described. At the back center of the body 10 there is located a hinge housing 18 which has a front wall 19 secured to the exterior of the shell 12. The hinge housing 18 has two end walls 20 and a shaped rear wall 21. The end walls 20 mount a pair of opposed ears 22 which are formed on a hinge bracket 23. The ears 22 are pivoted to the end walls 20 by means of rivets 24. The hinge bracket 23 has a generally horizontally extending arm 25 which terminates in an upwardly turned flange 26 and has a formed loop 27 in which is engaged the turned over end of a downwardly extending pull rod 28. The pull rod 28 is pivotally connected at its lower end to an eccentric 29 mounted on the rear of a shaft 30 which extends forwardly beneath the pocket 13 to the front of the roaster body and on its front end carries a rotatable knob 31.

By rotating the knob 31 the housewife rotates the eccentric 29 and pulls downwardly on the rod 28 which swings the hinge bracket 23 around its axes on the rivets 24 in a counterclockwise direction (Figure 2) also swinging the cover 11 upwardly and rearwardly to permit access to the interior of the insert 15.

The cover 11 has a rearwardly extending canopy 32 which overlies the top of the hinge mechanism just described and is curved at the rear to blend into the contours of the hinge mechanism housing 18. The cover canopy 32 mounts a clip 33 having two downwardly extending forward arms 34 which are engageable with the vertical flange 26 of the hinge bracket 23. The engagement of the arms 34 with the flange 26 retains the cover 11 on the hinge bracket 23 and thus in position to overlie the open top of the insert 15 when lowered into place. The co-mating parts for supporting the cover on the hinge bracket 23 include the upturned flange 26, the arms 34 of the clip 33 which is secured to the canopy 32, and the part 39a of the cover flange.

The cover 11 is provided with an observation window 35 positioned near its front center and a rotatable vent 36 for controlling the escape of cooking vapors to provide for the degree of browning desirable in the cooking. The roaster may also be provided with a manually operated thermostat, controlled by a knob 37 located at the front near the control knob 31 and may have a pilot light 38 to indicate when the resistance coil 17 is energized.

At the rear center portion of the cover 11 beneath the canopy 32, the cover is formed with an extending pocket 39 shown in Fig. 3 which lies between the positions of the downwardly extending arms 34. A socket block 40 is secured, for example, by long rivet bolts 41, to the hinge bracket 23 and an aperture 42 in the vertical flange 26 of the hinge bracket 23 is in line with a similar aperture 43 in the flange part 39a of the cover 11, when the cover 11 is mounted on the hinge bracket. The pocket 39 and the apertures 42 and 43 are provided to permit the reception and removal of an illuminating unit 44. The socket block 40 has two female contacts 45 each of which is adapted to receive one of a pair of contact pins 46. The contact pins 46 are mounted in a unit plug 47 which, like the socket block 40, is made of insulating material, preferably ceramic or a high melting point resin, so as not to be affected by the cooking temperatures.

The contact pins 46 are secured in the unit plug 47 by means of nuts 48 threaded on their innermost ends and bearing against the unit plug 47, the opposite ends of the contacts 46 being provided with flanges 49 set in counter-bores 50 in the plug 47. The plug 47 is riveted to a base plate 51 of a lamp enclosure 52 to which the base plate in turn is riveted. The lamp enclosure 52 has an open inner end across which is located a small window 53 and contains a bulb 54. The two leads from the bulb 54 are connected one to each of a pair of washers 55 that are held in place by the nuts 48 to establish the connection between the bulb 54 and the contact pins 46. The bulb 54 is enclosed in an envelope of heat resistant cloth 56, for example, woven asbestos, which surrounds the bulb 54 and cushions it against damage.

Each of the female contacts 45 is connected to one of a pair of leads 57 which places the lamp in circuit with the main switch and thermostat controlled by the hand knob 37 located on the front of the roaster body.

In Figures 3 and 4 of the drawings the illuminating unit 44 is shown as partially withdrawn. It should be noted that the socket block 40 and the unit plug 47 are provided with complementary shoulders 58 and the unit plug 47 has a reduced section 59 which slidingly enters a socket 60 in the socket block 40.

In order to remove the cover 11 from the cover bracket 23, the illuminating unit 44 must first be removed by sliding it to the right (Figure 3) and then the cover 11 can be tilted upwardly and backwardly relative to the bracket 23 to disengage the arms 34 from the flange 26 of the bracket 23. When the cover 11 is in place on the bracket 23 the illuminating unit 44 is socketed into position and the edges of the plate 51 positioned against the interior of that portion of the cover 11 at the bottom of the pocket 39. This assists in retaining the cover 11 fixedly in place on the cover bracket 23. When the bulb 54 burns out, the entire illuminating unit 44 is removed and replaced with a new unit 44. This eliminates the necessity for laboriously changing burned out lamps and, by enclosing the lamp in a sealed container, prevents any contamination of the food or destruction of lamps from liquids on the heated lamp envelopes.

Thus the unitary illuminating means embodying the invention is located within the interior of the roaster and casts light over the food being cooked. By looking through the window 35 in the cover 11, the housewife can observe the food as it cooks and can decide whether or not it requires attention without the necessity for opening the cover 11, causing a loss of heat or permitting the escape of steam which might burn her hands or face were she peering into the roaster. The provision of a unitary illuminating means which is completely disengageable from the permanent socket 40 also allows the cover to retain its separable feature thus permitting its entire interior to be thoroughly washed to remove all condensed juices or vapors and allow its maintenance in clean condition.

Having described the invention, I claim:

1. A food roaster comprising an open-topped body, a cover for said body having a downwardly extending flange for engaging said body when closed, a hinge mechanism at the rear of said body and including a hinge arm rotatable about a transversely extending hinge axis, comating parts between the hinge arm and cover and including that part of the cover flange adjacent said hinge arm for positioning the cover relative to the hinge arm and disengageable to permit removal of the cover therefrom, a socket mounted on said hinge arm in proximity to the said adjacent part of the cover flange, said comating part of the hinge arm and said adjacent part of the cover flange having aligned apertures therethrough in alignment with said socket when the cover is positioned on the hinge arm, and a lamp including a plug extending through said aligned apertures and into said socket and operating in socketed position as a key to prevent removal of the cover from the hinge arm and providing illumination for the interior of the body but removable from said socket to permit removal of the cover from the hinge arm.

2. A food roaster as claimed in claim 1, wherein the lamp comprises a replaceable assembly having a lamp enclosing shell with an open end, a window glass closing said end, a flange member mounted on said shell and secured to said plug for retaining the plug in position, and contact pins mounted in said plug and electrically connected to the lamp.

References Cited in the file of this patent
UNITED STATES PATENTS

| Number | Name | Date |
|---|---|---|
| 1,108,890 | Davenport | Sept. 1, 1914 |
| 1,165,409 | Helm | Dec. 28, 1915 |
| 1,274,880 | Helm | Aug. 6, 1918 |
| 2,341,648 | Parr | Feb. 15, 1944 |